United States Patent [19]

Quentin

[11] Patent Number: 4,904,756
[45] Date of Patent: Feb. 27, 1990

[54] MOLDABLE/EXTRUDABLE THERMOTROPIC COPOLYESTERS/COPOLYESTERAMIDES

[75] Inventor: Jean-Pierre Quentin, Lyons, France

[73] Assignee: Rhone-Poulenc Chimie, Courbevoie, France

[21] Appl. No.: 217,353

[22] Filed: Jul. 11, 1988

[30] Foreign Application Priority Data

Jul. 10, 1987 [FR] France .................................. 87 10177

[51] Int. Cl.⁴ .............................................. C08G 63/02
[52] U.S. Cl. .................................... 528/193; 528/176; 528/184; 528/190; 528/194; 528/206
[58] Field of Search ............... 528/176, 184, 190, 193, 528/194, 206

[56] References Cited

U.S. PATENT DOCUMENTS

| | | | |
|---|---|---|---|
| 3,598,864 | 8/1971 | Caldwell et al. | 528/193 |
| 3,987,109 | 11/1976 | Brennan et al. | 528/219 |
| 4,169,933 | 10/1979 | Jackson, Jr. et al. | 528/193 |
| 4,496,712 | 1/1985 | Irwin | 528/194 |
| 4,499,256 | 2/1985 | Blundell et al. | 528/193 |
| 4,499,259 | 2/1985 | Irwin | 528/194 |
| 4,717,624 | 1/1988 | Ikenaga et al. | 528/190 |
| 4,727,131 | 2/1988 | Kock et al. | 528/193 |
| 4,764,582 | 8/1988 | Hisgen et al. | 528/193 |

FOREIGN PATENT DOCUMENTS

| | | |
|---|---|---|
| 0066359 | 8/1982 | European Pat. Off. |
| 0088742 | 9/1983 | |
| 0102160 | 3/1984 | European Pat. Off. |
| 2576027 | 7/1986 | France |

OTHER PUBLICATIONS

Patent Abstracts of Japan, vol. 8, No. 67(C-216) [1504] Mar. 29, 1984.

Primary Examiner—Harold D. Anderson
Assistant Examiner—T. Mosley
Attorney, Agent, or Firm—Sherman and Shalloway

[57] ABSTRACT

High molecular weight thermotropic copolyesters and copolyesteramides which can be molded/extruded into a wide variety of useful shaped articles having improved thermomechanical properties are comprised of recurring structural units of the formulae (I), (II), (III) and (IV), wherein (I) represents the structure:

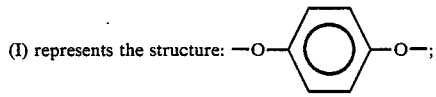

(II) represents the structure:

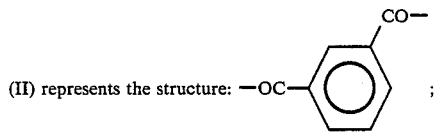

(III) represents the structure:

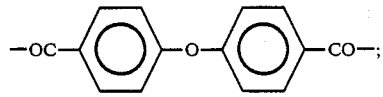

(IV) represents the structure:

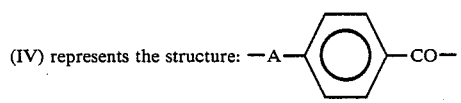

in which the symbol A is an oxygen atom or the NH group;

the molar ratio of the units (I) relative to the sum of the units (II)+(III) ranges from 0.95 to 1.05;

the amount of the units (II) in the mixture of (II)+(III) ranges from 20 to 90 mol % and that of the units (III), on the same basis, ranges from 80 to 10 mol %;

the amount of the units (IV), expressed relative to the amount of the units (I), ranges from 25 to 300 mol %; and said copolyesters and copolyesteramides have a flow temperature ranging from 200° to 350° C.

15 Claims, No Drawings

MOLDABLE/EXTRUDABLE THERMOTROPIC COPOLYESTERS/COPOLYESTERAMIDES

CROSS-REFERENCE TO COMPANION APPLICATIONS

My copending applications, Ser. No. 129,289, filed Dec. 7, 1987, and Ser. No. 07/217,352 and Ser. No. 07/217,350, both filed concurrently herewith and all assigned to the assignee hereof.

BACKGROUND OF THE INVENTION

1. Field of the Invention:

The present invention relates to novel moldable/extrudable thermotropic aromatic copolyesters and copolyesteramides and to the preparation thereof from a hydroquinone, or ester/amide-forming derivative thereof, from a mixture of aromatic dicarboxylic acids or ester/amideforming derivatives thereof, from at least one aromatic carboxylic hydroxyacid or ester/amide-forming derivative thereof or from at least one aromatic carboxylic amino acid or ester/amide-forming derivative thereof.

2. Description of the Prior Art:

Thermotropic polyesters prepared from one or more diphenols and one or more aromatic and/or cycloaliphatic dicarboxylic acids are known to this art. Polyesters of this type are described, for example, in French Pat. No. 2,270,282. Among the polyesters described therein, those produced from a substituted hydroquinone (or ester-forming derivative thereof), terephthalic acid (or ester-forming derivative thereof) and 4,4'-dicarboxydiphenyl ether (or ester-forming derivative thereof) are particularly valuable polymers.

SUMMARY OF THE INVENTION

A major object of the present invention is the provision of novel thermotropic polyesters which can be prepared more economically than the aforenoted copolyesters known to the art, by, on the one hand, replacing the substituted hydroquinone (or ester-forming derivative thereof) with a less costly diphenol such as unsubstituted hydroquinone (or ester/amide-forming derivative thereof), and, on the other, employing the 4,4'-dicarboxydiphenyl ether (or ester/amide-forming derivative thereof), which is also a costly reactant, in a lower concentration in the starting reactant mixture and adding thereto a suitable supplementary reactant which is less costly and which is readily available on an industrial scale.

Another object of this invention is the provision of novel thermotropic polyesters which have improved thermomechanical properties vis-a-vis the known copolyesters discussed above.

Briefly, the present invention features novel moldable/extrudable thermotropic aromatic copolyesters and copolyesteramides comprising recurring units of the formulae (I), (II), (III) and (IV), wherein:

(I) represents the structure: 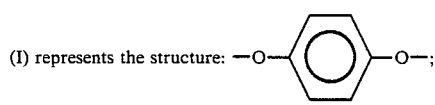

(II) represents the structure: 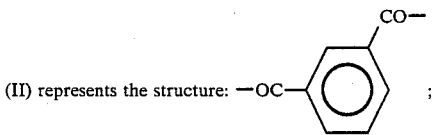

(III) represents the structure:

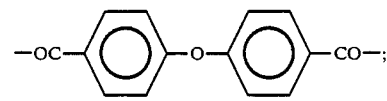

(IV) represents the structure: 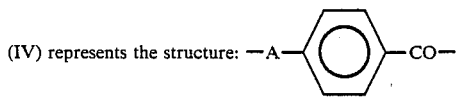

in which the symbol A is an oxygen atom or the NH group;

the molar ratio of the units (I) relative to the sum of the units (II) +(III) ranges from 0.95 to 1.05;

the amount of the units (II) in the mixture of (II)+(III) ranges from 20 to 90 mol % and that of the units (III), on the same basis, ranges from 80 to 10 mol %;

the amount of the units (IV), expressed relative to the amount of the units (I), ranges from 25 to 300 mol %; and said copolyesters and copolyesteramides have a flow temperature ranging from 200° to 350° C.

DETAILED DESCRIPTION OF THE PREFERRED EMBODIMENTS OF THE INVENTION

More particularly according to the present invention, the recurring structural units of formula (I) are advantageously derived from unsubstituted hydroquinone or from a diester thereof.

The recurring structural units of formula (II) are derived from isophthalic acid or from an ester/amide-forming derivative thereof, such as, for example, a dihalide or a diester.

The recurring structural units of formula (III) are derived from 4,4'-dicarboxydiphenyl ether or from an ester/amide-forming derivative thereof, such as, for example, a dihalide or a diester.

The recurring structural units of formula (IV) are derived from para-hydroxybenzoic acid (A is then an oxygen atom) or from para-aminobenzoic acid (A is then the NH group) or from an ester/amide-forming derivative thereof, such as, for example, the compound obtained by acylation of the phenol group (in the case of para-hydroxybenzoic acid) or of the amine group (in the case of para-aminobenzoic acid) or the compound obtained by esterifying the acid group, or a halide of the acid group.

In a preferred embodiment of the invention, the copolyesters and copolyesteramides have the formula given above, in which:

the amount of the units (II) in the mixture of (II)+(III) (III) ranges from 30 to 85 mol % and that of the units (III), on the same basis, ranges from 70 to 15 mol %; and the amount of the units (IV), expressed relative to the amount of the units (I), ranges from 30 to 200 mol %.

As regards the inherent viscosity of the subject polymers, this is measured at 25° C. on a solution containing 0.5 g of copolyester or copolyesteramide per 100 cm$^3$ of a para-chlorophenol/1,2-dichloroethane solvent mixture (50/50 by volume). The copolyesters and copolyesteramides in accordance with the present invention have an inherent viscosity of at least 0.3 dl g$^{-1}$; preferably, they have an inherent viscosity of at least 0.5 dl g$^{-1}$, and, more preferably, the inherent viscosity ranges from 0.5 to 4.0 dl g$^{-1}$.

As regards the flow temperature, this preferably ranges from 260° C. to 330° C. By "flow temperature" is intended the temperature at which the edges of a flake-shaped sample of polymer or of a cut fiber begin to become rounded. This temperature is determined by observing the sample visually on a cover glass at a suitable rate of temperature increase, generally on the order of 10° to 20° C. per minute, such observation being carried out using a microscope equipped with a heated stage, commercially available under the trademark Thermopan.

The copolyesters and copolyesteramides according to the present invention also include polymers whose structural formula may additionally contain aromatic recurring units providing ester and amide groups (dioxy units and/or dicarbonyl units and/or mixed oxy/carbonyl or secondary amino/carbonyl units) having a structure other than that of the units (I), (II), (III) and (IV), the total amount of these additional units being not more than 10 mol % relative to the amount of the units (I). Exemplary of such additional recurring units are those of the formulae:

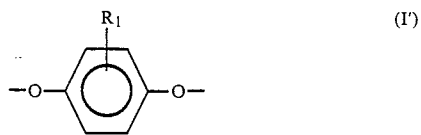

in which R$_1$ is a methyl radical or a chlorine atom, with the proviso that the units (I') may either be identical or different,

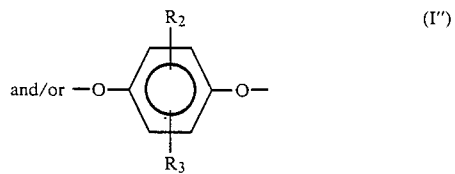

in which R$_2$ and R$_3$, which may be identical or different, each have the same definition given above for R$_1$, with the proviso that the units (I'') may also be identical or different,

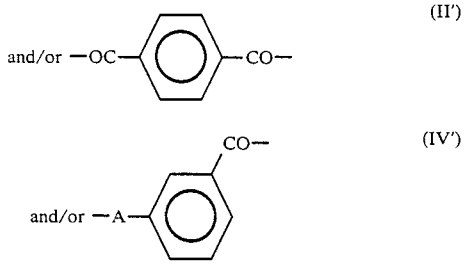

in which the symbol A is as defined above with regard to the units (IV).

The recurring structural units of the formula (I') are provided by a hydroquinone monosubstituted with a methyl radical or a chlorine atom, or from its diester or from a mixture of monosubstituted hydroquinones or of their diesters.

The recurring structural units of formula (II') are provided by terephthalic acid or from a derivative thereof, such as, for example, a dihalide or a diester. The recurring structural units of formula (IV') are provided by meta-hydroxybenzoic acid or from an ester-/amideforming derivative thereof, or from meta-aminobenzoic acid or from an ester/amide-forming derivative thereof.

It will be appreciated that the total amount of all the dioxy recurring units and of all the dicarbonyl recurring units which are then present in the copolyester or the copolyesteramide will need to be such that the molar ratio of all the dioxy units relative to the sum of all the dioxy units + all the dicarbonyl units ranges from 0.95 to 1.05.

The copolyesters and the copolyesteramides according to the present invention exhibit the major characteristic of being thermotropic, namely, they are capable of forming anisotropic melts which are easy to shape by spinning, film-forming or molding. Thermotropy is easy to demonstrate when the polymer is observed in melt form in an optical system equipped with two crossed polarizers (90°): birefringence and transmission of polarized light through the crossed polarizers occur in the case of anisotropic specimens. The demonstration of anisotropy in the polymers according to the present invention is carried out by the TOT thermooptical method described in French Pat. No. 2,270,282.

Consequently, melts in an anisotropic state have a specific orientation and a relatively high degree of organization, which can also be demonstrated in shaped articles such as filaments, films and molded objects, thus providing (even in the crude state) improved properties such as modulus and tenacity (which are not usually found in isotropic raw materials).

It should be appreciated that these anisotropic melts have an anisotropy range extending over at least 30° C. By "anisotropy range" is intended the temperature interval beginning with the temperature at which the birefringence and the transmission of light through the two crossed polarizers appears and which is above this temperature, an interval which has a variable upper limit and in which the melt is anisotropic without any danger of decomposition of the thermotropic polymer.

The copolyesters and copolyesteramides according to the present invention may be shaped using any known process such as molding, spinning or film-forming, etc., and, obviously, by carrying out each operation within the anisotropy range so as to produce articles which have satisfactory properties. In particular, the presence of the mixed oxy/carbonyl or secondary amino/carbonyl (IV) units in the structure of the polymers in accordance with the present invention enables the average price of the raw materials to be decreased and consequently the cost of production of shaped articles produced from these polymers to be minimized. Furthermore, for example in the case of molded articles, an appreciable improvement is observed in the values of certain mechanical properties, especially the values of flexural and torsional moduli and, in addition, a better retention of the mechanical properties as a function of temperature is also observed (when compared with the shaped polymers devoid of such mixed recurring units).

The mechanical properties, particularly those of thin articles, can be further increased by a heat treatment at elevated temperature, below the melting temperature of the polymer.

Depending upon the particular application intended therefor, the copolyesters and copolyesteramides according to the invention may include additives such as, in particular, colorants, stabilizers against the effects of light, oxygen and heat, fillers or reinforcing fillers, and fireproofing agents.

The copolyesters and copolyesteramides in accordance with the present invention may be prepared by various known polymerization processes.

For example, they may be prepared by reacting:

(i) hydroquinone, optionally mixed with another (or other) diphenol(s) such as, for example, one or more monosubstituted hydroquinone(s) and/or one or more disubstituted hydroquinone(s), with (2) a derivative of isophthalic acid, either alone or optionally mixed with a derivative of another aromatic dicarboxylic acid such as, for example, terephthalic acid, and with (3) a derivative of 4,4'-dicarboxydiphenyl ether, and with (4) a derivative of para-hydroxybenzoic acid involving the acid group, or a derivative of paraaminobenzoic acid involving the acid group, also either alone or optionally mixed with a derivative of the same type of another aromatic hydroxyacid such as, for example, metahydroxybenzoic acid or of another aromatic amino acid such as, for example, meta-aminobenzoic acid, the said acid derivative being either a halide such as, for example, a chloride, or an aryl ester such as, for example, a phenyl, tolyl or naphthyl ester (the said derivative obviously being a dihalide or a diester in the case of a dicarboxylic acid). The reaction is generally carried out in the presence of a catalyst, such as those described in Canadian Pat. No. 735,543.

In this process, the reactants are employed in proportions such that:

(i) the molar ratio diphenol(s)/diacid derivatives ranges from 0.95 to 1.05;

(ii) the amount of isophthalic acid derivative in the mixture of isophthalic acid derivative +4,4'-dicarboxydiphenyl ether derivative ranges from 20 to 90 mol %, and preferably from 30 to 85 mol %;

(iii) the amount of para-hydroxybenzoic acid or para-aminobenzoic acid derivative ranges from 25 to 300 mol % relative to the amount of unsubstituted hydroquinone, and preferably from 30 to 200 mol %; and (iv) the total amount of the reactants employed, other than the unsubstituted hydroquinone, the isophthalic acid derivative, the 4,4'-dicarboxydiphenyl ether derivative and the para-hydroxybenzoic or para-aminobenzoic acid derivative does not exceed 10 mol % relative to the amount of unsubstituted hydroquinone.

The polymers produced according to this first process generally have end groups which are, on one end of the molecule, of the phenolic H and/or of the $NH_2$ H type and, on the other end of the molecule, of the halide or aryloxy type.

It is also possible to prepare the copolyesters and the copolyesteramides according to the invention by direct esterification and amidification between the diphenol(s) envisaged, the aromatic dicarboxylic acids and the aromatic hydroxy acid(s) or the aromatic amino acid(s). The copolyesteramides thus obtained generally have end groups of the phenolic H type and/or of the $NH_2$ H and acidic OH type.

Preferably, however, a third process employing an acidolysis reaction is employed. In accordance with this preferred process:

(1) a diester of unsubstituted hydroquinone optionally mixed with one or more diesters of another (or other) diphenol(s) such as, for example, one or more monosubstituted hydroquinone(s) and/or one or more disubstituted hydroquinone(s), is reacted with (2) isophthalic acid taken either alone or optionally mixed with another aromatic dicarboxylic acid such as, for example, terephthalic acid, and with (3) 4,4'-dicarboxydiphenyl ether, and with (4) a derivative of para-hydroxybenzoic acid acylated on the phenol group or a derivative of paraaminobenzoic acid acylated on the amine group, taken either alone or optionally mixed with an acylated derivative of the same type of another aromatic hydroxyacid such as, for example, meta-hydroxybenzoic acid or of another aromatic amino acid such as, for example, meta-aminobenzoic acid, the said diphenol diester being prepared from an alkanoic acid containing from 2 to 6 carbon atoms such as, for example, an acetic ester and the said hydroxyacid or amino acid derivative acylated on the hydroxyl or amino group being prepared from an anhydride or from a halide such as, for example, a chloride derived from an alkanoic acid containing from 2 to 6 carbon atoms such as, for example, an acetylated derivative.

Here, too, the reaction is generally carried out in the presence of a catalyst such as, especially, sodium, magnesium, manganese and zinc acetate, butyl titanate and antimony trioxide. It generally begins at a temperature of from 260° C. to 310° C., and then the acid formed distills off. After approximately 80% of the acid theoretically to be distilled off has been collected, the temperature is progressively increased to a value above the temperature selected for beginning the reaction and ranging from 280° C. to 330° C., while the pressure is progressively reduced. When the distillation of the acid is complete, the polycondensation is continued under a high vacuum for a period of time which may range up to 30 minutes or more.

In this acidolysis process, the reactants are employed in proportions such that:

(i) the molar ratio diester(s) of diphenol(s)/total diacids ranges from 0.95 to 1.05;

(ii) the amount of isophthalic acid in the mixture of isophthalic acid +4,4'-dicarboxydiphenyl ether ranges from 20 to 90 mol %, and preferably from 30 to 85 mol %;

(iii) the amount of the para-hydroxybenzoic or para-aminobenzoic acid derivative acylated on the phenol or amine group ranges from 25 to 300 mol % relative to the amount of diester of unsubstituted hydroquinone, and preferably from 30 to 200 mol %; and (iv) the total amount of the reactants employed, other than the diester of unsubstituted hydroquinone, isophthalic acid, 4,4'-dicarboxydiphenyl ether and the acylated derivative of para-hydroxybenzoic acid or of paraaminobenzoic acid does not exceed 10 mol % relative to the amount of diester of unsubstituted hydroquinone.

The polymers obtained according to this third process generally have end groups which are, on one end of the molecule, of the alkoxy and/or acylamino type and, on the other end, of the acid OH type.

In order to further illustrate the present invention and the advantages thereof, the following specific examples are given, it being understood that same are intended only as illustrative and in nowise limitative.

In said examples to follow, a certain number of controls were carried out on the copolyesteramides. The operating procedures and/or the standards according to which these controls were carried out are given below:

Torsional modulus:

This was determined at various temperatures using an automatic torsional pendulum at a frequency on the order of 1 hertz according to the ISO standard R 537 method B, the test specimens being conditioned at an RH of 50 according to NF standard T 51 104. The results are expressed in MPa.

Flexural modulus:

This determination was carried out at 23° C. in accordance with the NF standard T 51 001 on 80×8×4 mm bar-type test specimens, conditioned at an RH of 50. The results are expressed in MPa.

Charpy impact strength:

This was carried out at 23 C in accordance with the NF standard T 51 035 on 60×10×4 mm bar-type test specimens incorporating U-shaped notches, conditioned at an RH of 50. The results are expressed in $kJ/m^2$.

EXAMPLE 1:

The following reactants and catalyst were introduced into a stirred and heated polycondensation reactor equipped with a device for distillation and for purging with an inert gas:
(1) hydroquinone diacetate: 41.91 g
   [molar ratio (1)/(2) +(3)=1];
(2) isophthalic acid: 29.88 g
   [83 mol % in the mixture of (2)+(3)];
(3) 4,4'-dicarboxydiphenyl ether: 9.29 g
   [17 mol % in the mixture of (2)+(3)];
(4) para-acetoxybenzoic acid: 32.40 g
   [83 mol % relative to (1)];
(5) magnesium acetate: 0.049 g
   [500 ppm].

The reactor was purged with nitrogen and was then heated with a metal bath set at 260° C. Acetic acid began to distil after a few minutes, the first drop of acid which distilled over corresponding to time zero. After 14 minutes, 24 cm³ of acetic acid (68.6% of theory) were collected. The temperature of the metal bath was then progressively increased to 330° C. in 17 minutes; over the same time period, the pressure was reduced from 1,010×10² Pa to 13.3×10² Pa. Heating at 330° C. was continued for 15 minutes while the pressure was reduced to 0.39×10² Pa during the same time period. The total volume of acetic acid distilled was 35 cm³ (i.e., 99.5% of theory).

The polymer obtained was white and fibrous in appearance. It had an inherent viscosity of 0.90 dl $g^{-1}$. The flow temperature was 290° C. The anisotropy region ranged from 300° C. to more than 360° C.

The results of the flexural and impact measurements are reported in the Table below.

With regard to molded test specimens permitting the mechanical properties to be measured, these were prepared using a screw press known to the art under the trademark KAP. For this purpose, the copolyesteramide obtained was milled and was then dried at 150 C for 4 hours and the granules formed were injection-molded under the following conditions:

(i) temperature of the melt vessel: 320° C.
(ii) mold temperature: 25° C.
(iii) injection pressure: 22.5 MPa.

EXAMPLE 2

The following materials were introduced into the same apparatus as that described in Example 1:
(i) hydroquinone diacetate: 41.91 g
   [molar ratio (1)/(2)+(3)=1];
(2) isophthalic acid: 29.88 g
   [83 mol % in the mixture of (2)+(3)];
(3) 4,4'-dicarboxydiphenyl ether: 9.29 g
   [17 mol % in the mixture of (2)+(3)];
(4) para-acetoxybenzoic acid: 48.6 g
   [125 mol % relative to (1)];
(5) magnesium acetate: 0.0648 g
   [500 ppm].

The reaction was then carried out as indicated in Example 1. A volume of 38.5 cm³ of acetic acid was recovered (96% of theory). The polymer obtained was white and fibrous in appearance. It had an inherent viscosity of 0.96 dl $g^{-1}$. The flow temperature was 290° C. The anisotropy region ranged from 300° C. to more than 360° C. The results of the flexural and impact measurements are reported in the Table below.

EXAMPLE 3

The following materials were introduced into the same apparatus as that described in Example 1:
(1) hydroquinone diacetate: 38.8 g
   [molar ratio (1)/(2)+(3)=1];
(2) isophthalic acid: 16.6 g
   [50 mol % in the mixture of (2)+(3)];
(3) 4,4'-dicarboxydiphenyl ether: 25.8 g
   [50 mol % in the mixture of (2)+(3)];
(4) para-acetoxybenzoic acid: 12.24 g
   [34 mol % relative to (1)];
(5) magnesium acetate: 0.047 g
   [500 ppm].

The reaction was then carried out as indicated in Example 1. A volume of 26 cm³ of acetic acid was recovered (97.3% of theory). The polymer obtained was white and fibrous in appearance. It had an inherent viscosity of 0.825 dl $g^{-1}$. The flow temperature was 290° C. The anisotropy region ranged from 310° C. to more than 360° C. The results of the flexural and impact measurements are reported in the Table below.

EXAMPLE 4

The following materials were introduced into the same apparatus as that described in Example 1:
(1) hydroquinone diacetate: 38.8 g
   [molar ratio (1)/(2)+(3) =1];
(2) isophthalic acid: 16.6 g
   [50 mol % in the mixture of (2)+(3)];
(3) 4,4'-dicarboxydiphenyl ether: 25.8 g
   [50 mol % in the mixture of (2)+(3)];
(4) para-acetamidobenzoic acid: 12.17 g
   [34 mol % relative to (1)];
(5) magnesium acetate: 0.047 g
   [500 ppm].

The reaction was then carried out as indicated in Example 1. A volume of 25.5 cm³ of acetic acid was recovered (95.5% of theory). The polymer obtained was white and fibrous in appearance. It had an inherent viscosity of 1.04 dl $g^{-1}$. The flow temperature was 290° C. The anisotropy region ranged from 300° C. to more than 360° C. The results of the flexural and impact measurements are reported in the Table below.

TABLE

| EXAMPLE | FLEXURAL Modulus MPa | CHARPY IMPACT kJ/m² |
|---|---|---|
| 1 | 4,760 | 18.75 |
| 2 | 4,870 | 10.25 |
| 3 | 4,050 | 31.3 |
| 4 | 3,400 | 15 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A moldable/extrudable, high molecular weight thermotropic aromatic copolyester(amide) comprising recurring structural units of the formulae (I), (II), (III) and (IV), wherein:

(I) represents the structure: 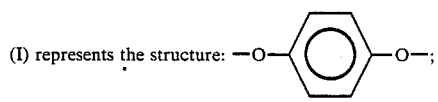

(II) represents the structure: 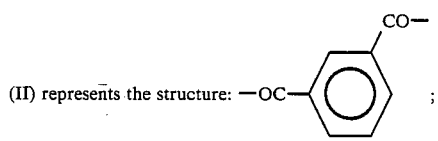

(III) represents the structure:

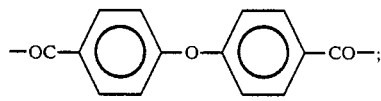

(IV) represents the structure: 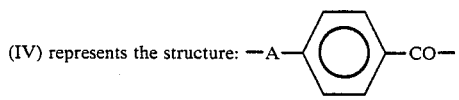

in which the symbol A is an oxygen atom or the NH group;

the molar ratio of the units (I) relative to the sum of the units (II)+(III) ranges from 0.95 to 1.05;

the amount of the units (II) in the mixture of (II)+(III) ranges from 20 to 90 mol % and that of the units (III), on the same basis, ranges from 80 to 10 mol %;

the amount of the units (IV), expressed relative to the amount of the units (I), ranges from 25 to 300 mol %; and said copolyester(amide) having a flow temperature ranging from 200° to 350° C.

2. The thermotropic copolyester (amide) as defined by claim 1, wherein the amount of the units (II) in the mixture of (II)+(III) ranges from 30 to 85 mol % and that of the units (III), on the same basis, ranges from 70 to 15 mol %, and the amount of the units (IV), expressed relative to the amount of the units (I), ranges from 30 to 200 mol %.

3. The thermotropic copolyester(amide) as defined by claim 1, having a flow temperature ranging from 260° to 330° C.

4. The thermotropic copolyester(amide) as defined by claim 1, further comprising additional recurring unit selected from the group consisting of aromatic dioxy structural units, aromatic dicarbonyl structural units, mixed aromatic oxy/carbonyl structural units, secondary amino/carbonyl structural units, and mixtures thereof, said additional recurring unit having a structure other than that of the units (I), (II), (III) and (IV), the total amount of such additional structural units being not more than 10 mol % relative to the amount of the units (I).

5. The thermotropic copolyester(amide) as defined by claim 4, said additional recurring structural units having the formulae:

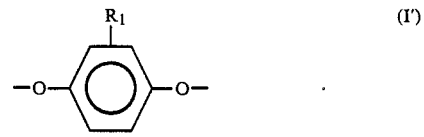

in which $R_1$ is a methyl radical or a chlorine atom, with the proviso that the units (I') are identical or different,

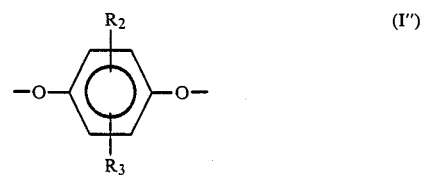

in which $R_2$ and $R_3$, which are identical or different, each have the definition given above for $R_1$, with the proviso that the units (I'') are identical or different,

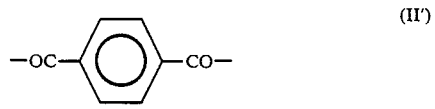

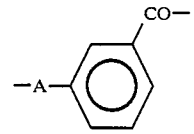

or mixtures thereof in which the symbol A is as defined with regard to the units (IV).

6. The thermotropic copolyester(amide) as defined by claim 1, having an inherent viscosity of at least 0.3 dl g$^{-1}$, measured at 25° C. on a solution containing 0.5 g of copolyester(amide) per 100 cm³ of a parachlorophenol/1,2-dichloroethane 50/50 solvent mixture.

7. The thermotropic copolyester(amide) as defined by claim 1, having an inherent viscosity of at least 0.5 dl g$^{-1}$, measured at 25° C. on a solution containing 0.5 g of copolyester(amide) per 100 cm³ of a parachlorophenol/1,2-dichloroethane 50/50 solvent mixture.

8. The thermotropic copolyester(amide) as defined by claim 7, having an inherent viscosity ranging from 0.5 to 4.0 dl g$^{-1}$.

9. A shaped article comprising a thermotropic copolyester(amide) as defined by claim 1.

10. A shaped article as defined by claim 9, comprising a fiber.

11. A shaped article as defined by claim 9, comprising a film.

12. A shaped article as defined by claim 9, comprising an extrudate.

13. A shaped article as defined by claim 9, comprising a molded substrate.

14. A thermotropic copolyester as defined by claim 1 wherein the symbol A is an oxygen atom.

15. A thermotropic copolyester as defined by claim 1 wherein the symbol A is the NH group.

* * * * *